(12) United States Patent
Lhuillier et al.

(10) Patent No.: US 9,631,724 B2
(45) Date of Patent: Apr. 25, 2017

(54) BRAKE SYSTEM MASTER-CYLINDER SEAL

(71) Applicant: Robert Bosch GmbH, Stuttgart (DE)

(72) Inventors: Laurent Lhuillier, Le Blanc Mesnil (FR); Marc Noblet, Paris (FR); Olivier Bernadat, Perreux (FR); Serge Aquino, Rosny sous Bois (FR); Julien Gateau, Gentilly (FR); Marc Rodriguez, Beverly Hills, MI (US)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/707,373

(22) Filed: May 8, 2015

(65) Prior Publication Data
US 2015/0298673 A1 Oct. 22, 2015

Related U.S. Application Data

(62) Division of application No. 13/995,413, filed as application No. PCT/EP2011/072420 on Dec. 12, 2011, now Pat. No. 9,239,110.

(30) Foreign Application Priority Data

Dec. 21, 2010 (FR) ..................... 10 05010

(51) Int. Cl.
*B60T 11/236* (2006.01)
*F16J 9/12* (2006.01)
(Continued)

(52) U.S. Cl.
CPC ............. *F16J 9/12* (2013.01); *B60T 11/165* (2013.01); *B60T 11/232* (2013.01);
(Continued)

(58) Field of Classification Search
CPC . B60T 11/236; F16J 9/12; F16J 15/164; F16J 15/3236; F16J 15/56
See application file for complete search history.

(56) References Cited

U.S. PATENT DOCUMENTS 7,343,741 B2* 3/2008 Bernadat ............... B60T 11/232
                                                         277/441
7,520,132 B2* 4/2009 Chiba ................... B60T 11/236
                                                          60/588
(Continued)

FOREIGN PATENT DOCUMENTS

CN        1839064       9/2006
CN       101134461      3/2008
(Continued)

OTHER PUBLICATIONS

International Search Report for PCT/EP2011/072420, dated Mar. 22, 2012.

*Primary Examiner* — Nicholas L Foster
(74) *Attorney, Agent, or Firm* — Norton Rose Fulbright US LLP

(57) ABSTRACT

A master-cylinder seal housed in a groove around a piston has a core connected to three annular and concentric lips. The core rests against a side of the groove and has: a surface provided with an interior edge followed by a peripheral platter cut by at least one channel, and an exterior crown provided with a connection zone formed by an interruption in the crown and deformable due to pressure within the seal to recreate the crown's continuity and impermeability while facilitating purging the brake system when there is no pressure in the channel and the connection zone.

13 Claims, 4 Drawing Sheets

(51) Int. Cl.
  *F16J 15/32* (2016.01)
  *F16J 15/56* (2006.01)
  *F16J 15/16* (2006.01)
  *B60T 11/232* (2006.01)
  *B60T 11/16* (2006.01)
  *F15B 15/02* (2006.01)
  *F16J 15/3236* (2016.01)
  *F16J 15/3232* (2016.01)

(52) U.S. Cl.
  CPC ............ *B60T 11/236* (2013.01); *F15B 15/02* (2013.01); *F16J 15/3232* (2013.01); *F16J 15/3236* (2013.01); *F16J 15/164* (2013.01); *F16J 15/56* (2013.01)

(56) References Cited

U.S. PATENT DOCUMENTS

| | | | | |
|---|---|---|---|---|
| 7,966,813 B2 * | 6/2011 | Struschka | ............ | B60T 11/228 277/437 |
| 8,578,710 B2 * | 11/2013 | Aoki | ..................... | B60T 11/236 277/436 |
| 8,590,304 B2 * | 11/2013 | Bernadat | ............... | B60T 11/236 60/586 |
| 2006/0219507 A1 * | 10/2006 | Drott | ..................... | B60T 11/236 188/322.17 |
| 2010/0066028 A1 * | 3/2010 | Aoki | ..................... | B60T 11/236 277/353 |
| 2010/0154407 A1 * | 6/2010 | Bernadat | ............... | B60T 11/236 60/533 |

FOREIGN PATENT DOCUMENTS

| | | |
|---|---|---|
| CN | 101528517 | 9/2009 |
| CN | 101529141 | 9/2009 |
| CN | 101900140 | 12/2010 |
| EP | 2 080 939 | 7/2009 |
| EP | 2 199 164 | 6/2010 |
| JP | 2003-261020 | 9/2003 |
| JP | 2004-231093 | 8/2004 |

* cited by examiner

BRAKE SYSTEM MASTER-CYLINDER SEAL

CROSS-REFERENCE TO RELATED APPLICATIONS

The present application is a divisional application of U.S. patent application Ser. No. 13/995,413, which is the U.S. national stage of international patent application no. PCT/EP2011/072420, filed Dec. 12, 2011, and which claims priority to French patent application no. 100 50 10, filed Dec. 21, 2010, the entire contents of each of which is hereby incorporated by reference herein.

FIELD OF THE INVENTION

The present invention relates to a brake system master-cylinder seal having a generally annular shape, housed in a groove of the master cylinder around the piston, the seal being of a type comprising a core connecting three lips appreciably annular and concentric, respectively internal, intermediate, and concentric, each of which is equipped with a free end and an end connecting with the core, at least one portion of the free end of the intermediate lip creating an axial protrusion with respect to the free ends of the internal and external lips, the intermediate lip being interrupted along its periphery in such a way that it has several circumferentially spaced portions forming support areas and passages with the wall opposite that against which the surface of the core rests.

BACKGROUND

There exist seals, notably described in European patent document EP 2,080,939, known as resupply seals, of the type described above, but under certain conditions, it is difficult to purge the master cylinder or, at least, to purge it effectively and completely.

SUMMARY

An object of the invention is to provide a seal, e.g., a brake system master-cylinder resupply seal, that facilitates purging the brake system before it is filled with brake fluid and constitutes a supplementary sealing element for pressures on the order of 1 to 3 bars.

According to the invention the surface of the core of the seal comprises:
  a peripheral platter,
  a raised exterior crown, externally bordering the platter and having: at least one connection zone, open and deformable from the effect of the interior pressure of the seal to recreate the continuity of the exterior crown,
  a heel beyond the crown and in the extension of each interruption formed by the connection zone of the crown,
  at least one channel realized in the platter and issuing from the interior edge that does not emerge at the exterior terminating ahead of the connection zone of the crown.

A channel that does not emerge at the exterior of the surface of the core of the seal is sufficient to constitute a passage to effectively purge the brake system when it is put in service. This also allows for the realization of a complementary sealing surface for certain pressures, notably, pressures comprised between 1 and 3 bars.

According to another advantageous characteristic, the platter terminates ahead of the exterior crown and forms, with the exterior crown, a passage constituting a supplementary sealing chamber, especially if the connection zone consists of a cavity made in the exterior crown.

According to another characteristic, the connection zone consists in the suppression of the exterior crown along a certain peripheral length. The material of the core near this connection zone can, thus, be deformed through the effect of the interior pressure of the seal to constitute a sealing zone in the extension of the exterior crown and on either side of it near the connection zone.

According to another advantageous characteristic, the peripheral platter is separated from the exterior crown by a passage near the channel and the interior edge. As indicated above, this passage, especially when the exterior crown has a connection zone consisting of a cavity, can form an intermediate chamber, promoting, on the one hand, the deformation of the connection zone from the effect of internal pressure and, on the other hand, constituting a sealing chamber.

The channel realized in the peripheral platter is preferably radially directed. This channel may be unique or several channels may be provided in the peripheral platter.

The invention also concerns a brake system master cylinder having a body with a pressure chamber receiving a piston, the bore hole of the pressure chamber having a groove receiving a seal providing a seal for the piston in the body of the master cylinder, wherein the groove separates the pressure chamber from a supply chamber connected to the hydraulic fluid supply channel, characterized in that the groove accommodates a resupply seal of generally annular shape having a core connecting three appreciably annular and concentric lips (x-x axis of the master cylinder), respectively internal, intermediate, and external, each of which is equipped with a free end and a connection end with the core, wherein at least one part of the free end of the intermediate lip protrudes axially (x-x direction) with respect to the free ends of the internal and external lips, the intermediate lip being circumferentially interrupted so as to have several spaced portions in the peripheral direction, forming support areas and passages with the wall opposite the wall against which the surface of the core rests, the surface of the core comprising:
  a peripheral platter
  a raised exterior crown, externally bordering the platter, the exterior crown having a connection zone that can be deformed by internal pressure on the seal to recreate the continuity of the exterior crown,
  a heel beyond the crown and in the extension of each interruption formed in the crown by the connection zone,
  at least one channel issuing from the interior edge not emerging at the exterior, terminating before the connection zone of the exterior crown.

According to another advantageous characteristic of the invention, the master cylinder is a simple master cylinder with a piston and a groove receiving a resupply seal or a tandem master cylinder with a principal piston and an auxiliary piston, each of which cooperates with a resupply seal housed in a groove of the body of the master cylinder.

DETAILED DESCRIPTION

Figure 1:
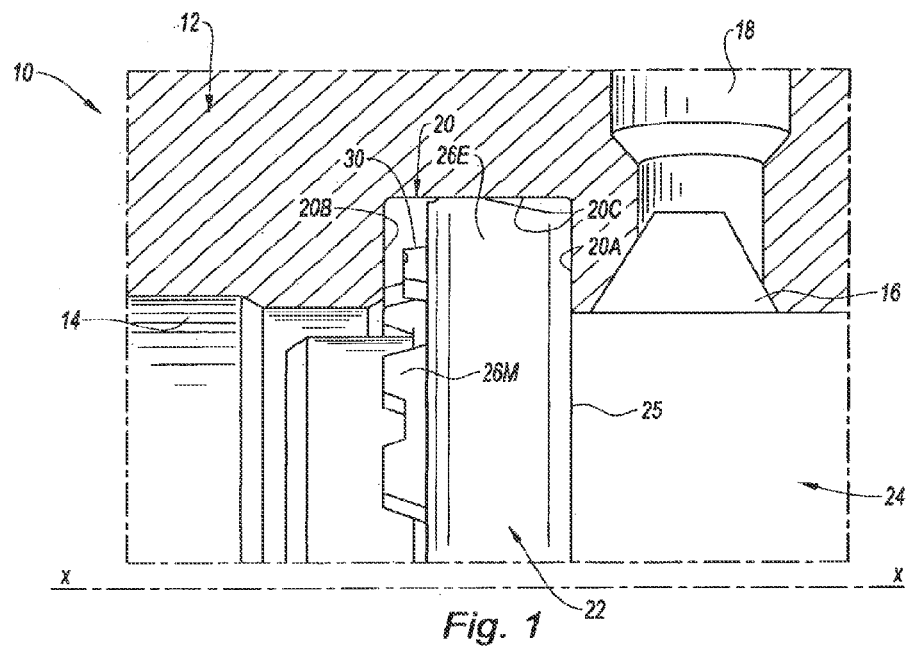
FIG. 1 shows a partial axial section of a brake system master cylinder according to the invention near a seal.

According to FIG. 1, seal 22, still referred to as a resupply seal, for brake system master cylinder 10 is shown. Body 12 of master cylinder 10 delimits pressure chamber 14 and brake fluid supply chamber 16, itself connected to supply channel 18. Body 12 has internal groove 20, which is annular, with back wall 20C and two opposed faces 20A, 20B. This groove 20 receives seal 22, which cooperates with piston 24 to separate chambers 14 and 16. Piston 24 is movable between a rest position, in which chambers 14 and 16 communicate, and an active position, when piston 24 is actuated by the brake pedal (movement to the left in FIG. 1) to transmit braking forces. At this moment chambers 14 and 16 are separated.

Figure 2:
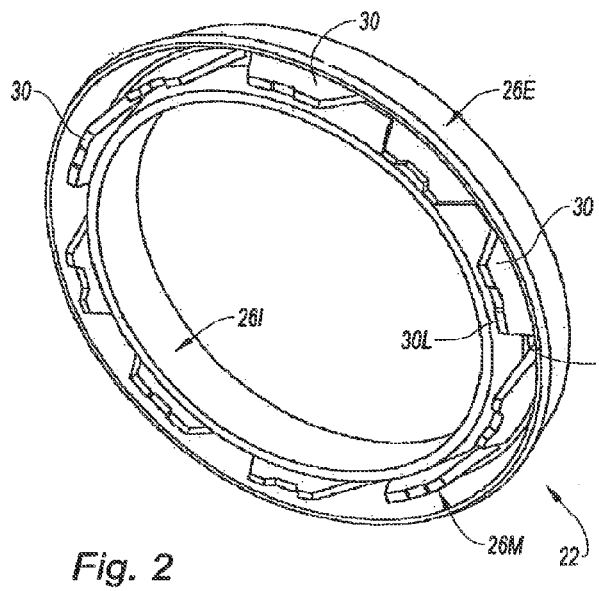
FIG. 2 shows a perspective view of the seal of FIG. 1.

Seal 22 (FIGS. 1 and 2) consists of core 25 bearing exterior lip 26E, interior lip 26I, and intermediate lip 26M. Intermediate lip 26M has raised portions separated by intervals. Intermediate lip 26M is intended to be applied to face 20B to hold seal 22, applied imperviously by its interior lip 26I, against piston 24.

The passage of brake fluid from supply chamber 16 to pressure chamber 14 occurs by bypassing seal 22 connected imperviously to piston 24. This bypassing occurs between core 25 and face 20A of groove 20, then between exterior lip 26E and back wall 20C of the groove, then in intervals of the raised portions 30 of intermediate lip 26M, because neither exterior lip 26E nor interior lip 26I rest imperviously on groove 20.

Figure 3A:
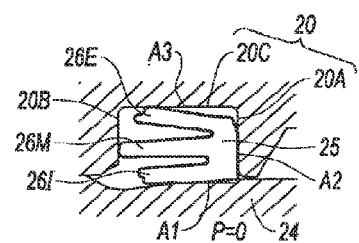
FIGS. 3A and 3B show respectively, and very schematically, illustrate the seal supports between the seal, the groove in the body of the master cylinder, and the piston, in the absence of pressure (FIG. 3A) and in the case of high pressure (FIG. 3B).
Figure 3B:
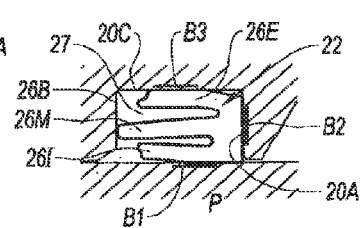

FIGS. 3A, 3B illustrate, respectively, the state of seal 22 in the absence of pressure (FIG. 3A) and when pressure is applied in pressure chamber 14 (FIG. 3B).

According to FIG. 3A, in the absence of pressure on seal 22, the latter is applied against piston 24 by its interior lip 26I, creating an impervious seal under low pressure on zone A1 of piston 24 because of the specific, frustoconical, shape of piston 24 at this location. This low pressure allows brake fluid to flow for ESP regulation. Core 25 rests only weakly against side 20A of groove 20, as illustrated schematically by point A2. The same holds for exterior lip 26E, which only lightly touches back wall 20C of groove 20 (point A3). As already indicated, side 20B of groove 20 is not affected by the seal but simply serves as a support for median lip 26M.

According to FIG. 3B, whenever pressure is generated, for example, by piston 24, in pressure chamber 14, this pressure is exercised in cavity 27 of seal 22, creating a significant impervious zone B1 with piston 24 and also an impervious zone B2, extending appreciably over first face 20A of groove 20, which accommodates the face of core 25. A seal is also created at exterior lip 26E, which presses against back wall 20C of groove 20. This seal is realized through the particular structure of the surface of core 25 according to the invention.

Figure 4:
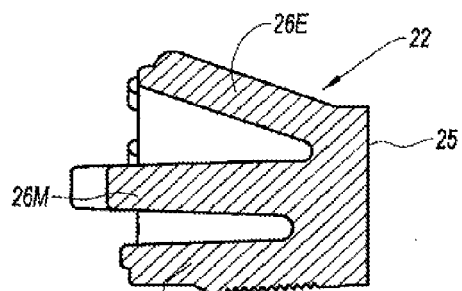
FIG. 4 shows a section of the seal according to the invention.

FIG. 4 shows the section of the shape of revolution of seal 22 when it is not housed in groove 20, revealing the shape of core 25, the shape of exterior branch 26E, equipped with protrusions, the shape of intermediate lip 26M, with its raised parts and hollows, serving as a support against wall 20B of groove 20 and allowing brake fluid to flow.

Two embodiments of the surface of core 25 of seal 22 will be described below by means of FIGS. 5 and 6. These surfaces are respectively assigned reference numbers 100 and 200, and analogous or equivalent elements will be assigned similar reference numbers in the 100 and 200 series.

Figure 5:
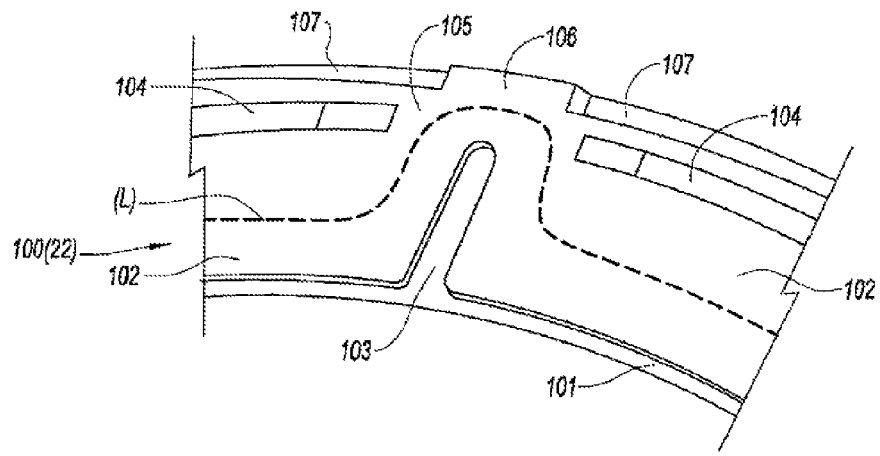
FIG. 5 shows a perspective view of a part of the rear face of the core of the seal of FIG. 4 with a first embodiment of the seal means.

FIG. 5 illustrates a portion of a first embodiment of surface 100 of core 25 of the seal, which corresponds to a relief pattern and a hollow pattern distributed along the periphery of core 25 following a uniform distribution pattern, even following a unique pattern.

Surface 100 consists of platter 102, raised with respect to interior peripheral edge 101. Platter 102 is traversed by channel 103, non-emergent, issuing from interior edge 102 and blocked at its externally directed end. Platter 102 is capped by discontinuous exterior crown 104, with interruption interval 105 in the direction of channel 103. Interruption interval 105 forms connection zone 105, which, when deformed under pressure, as will be described below, provides a seal due to the effect of the pressure. Beyond this connection zone 105, heel 106 appreciably occupies the width of the interval. Heel 106 is bordered by exterior edge 107. The direction of channel 103 is preferably radial, although this direction is not imperative. It can also be inclined with respect to the radial direction of the seal.

Figure 5A:
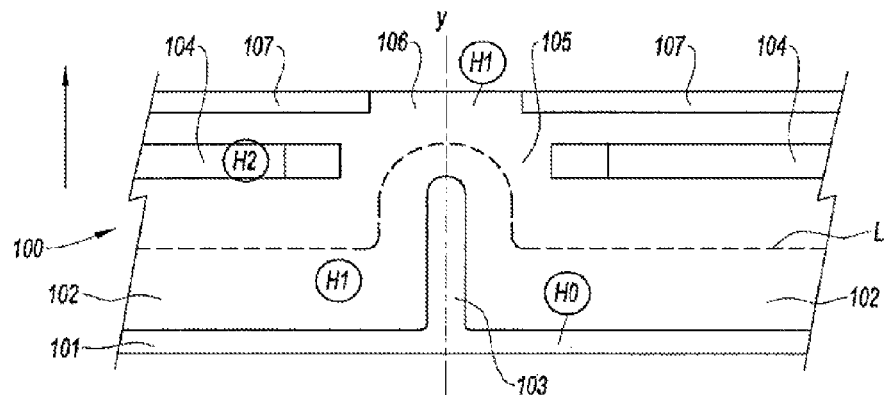
FIG. 5A shows a straight developed view of a portion of the surface of the core of the seal.
Figure 5B:
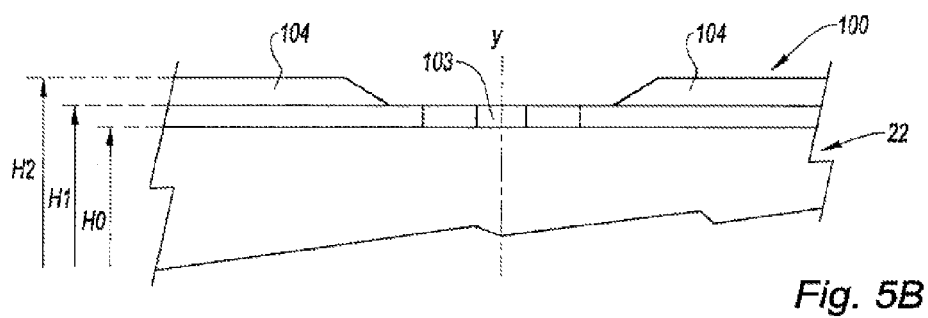
FIG. 5B shows a side view corresponding to FIG. 5A, illustrating the different reliefs on the face of the core.

The shape of the pattern of surface 100 is shown in the plan view of FIG. 5A, which is a straight development of the circular shape. FIG. 5B is a side view of the straight development corresponding to FIG. 5A and illustrating the various levels of the elements composing surface 100.

FIG. 5B shows the relation between the various levels in the radial direction with respect to an unspecified origin: the height, H0, of interior edge 101, the height, HI, of platter 102, and the height, H2, of interrupted crown 104. The channel has a back wall with height H0. In this view, heel 106 has the same height, HI, as platter 102.

Figure 5C:
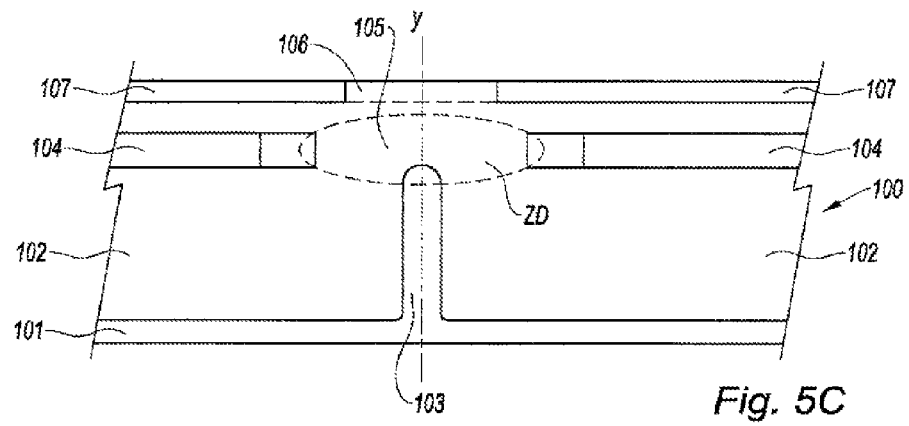
FIG. 5C shows a view similar to that of FIG. 4A, displaying the deformable zone of the face of the core.

FIGS. 5 and 5A illustrate, using a dashed line, the sealing line (L) of seal 100 when it is applied to face 20A of groove 20 (FIG. 1). The seal is realized by deformation under pressure of the interior of seal 100. The deformation involves zone ZD, drawn on FIG. 5C, which, when under pressure, is raised and flattens the surface of platter 102 in the interruption interval or connection zone 105 against face 20A of groove 20. Heel 106 serves to support this deformation force and constitutes a supplementary sealing surface when heel 106 is applied to side 20A.

Figure 6:
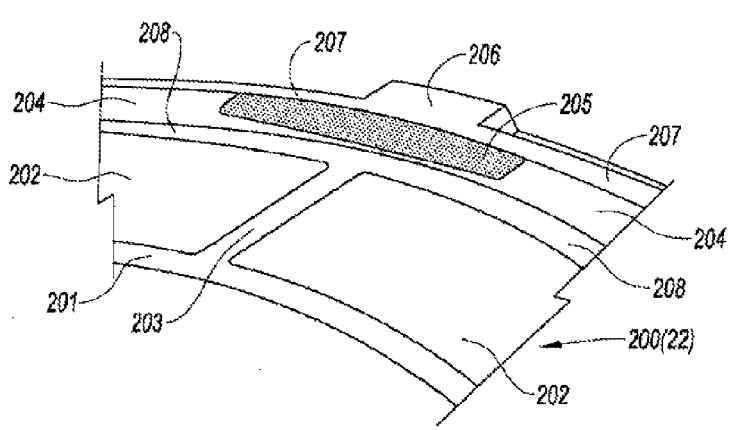
FIG. 6 shows a partial perspective view of the rear face of the core of the seal, illustrating a second embodiment of the seal means.
Figure 6A:
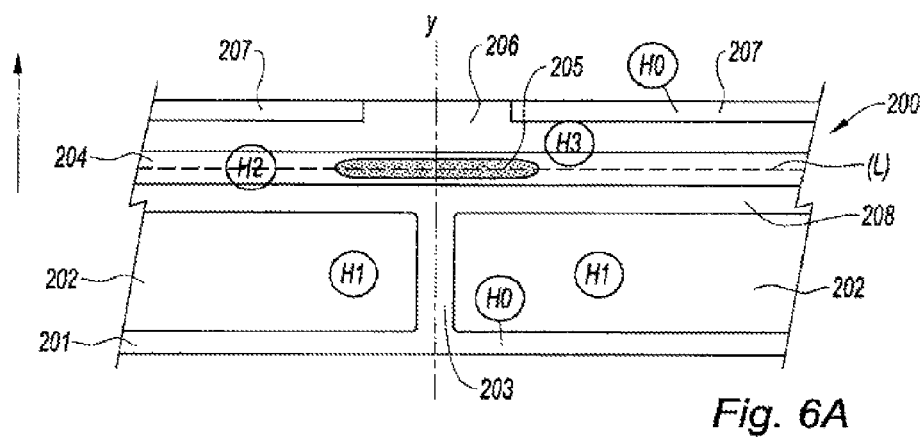
FIG. 6A shows a straight developed view of a portion of the surface of the core, illustrating a second embodiment of the seal means.
Figure 6B:
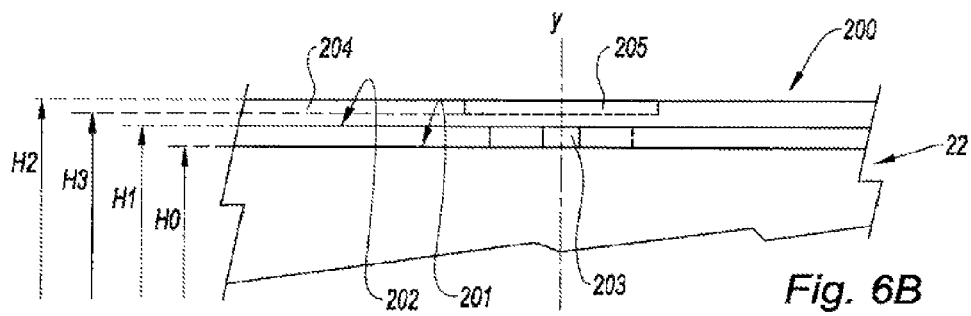
FIG. 6B shows is a side view corresponding to FIG. 6A illustrating the relief of different portions of the surface of the core.

FIGS. 6, 6A, 6B illustrate a second embodiment of surface 200 of core 25 of seal 22. Surface 200 consists of a pattern consisting of platter 202 beyond interior edge 201. Platter 201 is divided by channel 203 near interior edge 201.

Channel 203 emerges beyond platter 202 in the exterior peripheral direction, in peripheral passage 208.

Beyond the passage bordering platter 202 is exterior crown 204, equipped with cavity 205, which bars the extension of channel 203 and serves as a connection zone. Beyond cavity 205 is heel 206 with, on either side, exterior edge 207. Heel 206 is also situated in the extension of channel 203, extending on either side of this extension and there occupying a significant portion of the peripheral length of cavity 205.

When there is pressure inside seal 22, cavity 205 is deformed outwardly, closing the passage it forms in the absence of pressure. A seal is thereby ensured at exterior crown 204 and the surface of cavity 205, brought to the level of the exterior surface of crown 204, that is to say, connection zone 205.

The invention concerns the realization of a simple or tandem master cylinder such as the one partly shown in FIG. 1. Such a master cylinder has a single piston 24 or a primary piston and an auxiliary piston, and the impermeability between pressure chamber 14 and supply chamber 16 with supply channel 18 is provided by resupply seal 22, whose core has a sealing surface 100, 200, similar to those described above.

What is claimed is:

1. A substantially annular-shaped seal for being housed in a groove of a body of a brake system master cylinder and around a piston, the seal comprising:
    a core section; and
    three substantially annular and concentric lips including an interior lip, an intermediate lip, and an exterior lip;
    wherein:
        the three lips each includes a free end and a connection end connected with the core section, at least one portion of the free end of the intermediate lip extending axially beyond the free ends of the interior and exterior lips;
        a periphery of the intermediate lip is interrupted so as to include multiple circumferentially-spaced portions that, when the seal is housed in the groove with a surface of the core section resting against a first wall of the body of the master cylinder, forms supports and passages with a second wall of the body of the master cylinder opposite the first wall;
        the surface of the core section includes a peripheral platter, an exterior crown, a heel, and at least one channel;
        the exterior crown is axially raised compared to a height of, and occupies a radial region of the surface of the core section that is radially exterior to, the peripheral platter;
        the surface of the core section includes at least one connection zone that interrupts an extension of the exterior crown in the radial region;
        the heel is positioned radially exterior to the exterior crown and at a circumferential position shared by a respective one of the at least one connection zone;
        each of the at least one channel cuts through the peripheral platter and extends radially outward from an interior edge of the seal towards, and terminating before reaching, a respective one of the at least one connection zone; and
        at least one of the following:
            (a) the connection zone is a cavity in the exterior crown; and
            (b) the peripheral platter is separated from the exterior crown by a passage.

2. The seal according to claim 1, wherein the peripheral platter terminates before the exterior crown.

3. The seal according to claim 1, wherein the connection zone is the cavity in the exterior crown.

4. The seal according to claim 1, wherein the peripheral platter is separated from the exterior crown by the passage.

5. The seal according to claim 4, wherein the passage connects to the at least one channel.

6. The seal according to claim 5, wherein the passage extends in a direction that is circumferentially about a central longitudinal axis of the seal.

7. The seal according to claim 1, wherein the peripheral platter is arranged radially between the interior edge and exterior crown and is axially raised compared to a height of the interior edge.

8. A brake system master cylinder, comprising:
    a body including a pressure chamber which receives a piston, wherein the pressure chamber includes a bore hole, the bore hole including a groove which separates the pressure chamber from a supply chamber connected to a hydraulic fluid supply chamber; and
    a seal element providing a seal for the piston in the body of the master cylinder;
    wherein:
        the seal element is received in the groove;
        the seal element is substantially annular-shaped and includes a core section and three substantially annular and concentric lips including an interior lip, an intermediate lip, and an exterior lip;
        the three lips each includes a free end and a connection end connected with the core section, at least one portion of the free end of the intermediate lip extending axially beyond the free ends of the interior and exterior lips;
        the body of the master cylinder includes a first wall against which a surface of the core section rests;
        a periphery of the intermediate lip is interrupted so as to include multiple circumferentially-spaced portions forming supports and passages with a second wall of the body of the master cylinder opposite the first wall;
        the surface of the core section includes a peripheral platter, an exterior crown, a heel, and at least one channel;
        the exterior crown is axially raised compared to a height of, and occupies a radial region of the surface of the core section that is radially exterior to, the peripheral platter;
        the surface of the core section includes at least one connection zone that interrupts an extension of the exterior crown in the radial region;
        the heel is positioned radially exterior to the exterior crown and at a circumferential position shared by a respective one of the at least one connection zone;
        each of the at least one channel cuts through the peripheral platter and extends radially outward from an interior edge of the seal element towards, and terminating before reaching, a respective one of the at least one connection zone; and
        at least one of the following:
            (a) the connection zone is a cavity in the exterior crown; and
            (b) the peripheral platter is separated from the exterior crown by a passage.

9. The brake system master cylinder according to claim 8, wherein the master cylinder is (i) a simple master cylinder with a single piston and the groove receiving the seal element, or (ii) a tandem master cylinder with a principal piston and an auxiliary piston, each of which pistons cooperates with the seal element received in the groove of the body of the master cylinder.

10. The brake system master cylinder according to claim 8, wherein the peripheral platter terminates before the exterior crown.

11. The brake system master cylinder according to claim 8, wherein the connection zone is the cavity in the exterior crown.

12. The brake system master cylinder according to claim 8, wherein the peripheral platter is separated from the exterior crown by the passage.

13. A substantially annular-shaped seal for being housed in a groove of a body of a brake system master cylinder and around a piston, the seal comprising:
   a core section; and
   three substantially annular and concentric lips including an interior lip, an intermediate lip, and an exterior lip;
   wherein:
      the three lips each includes a free end and a connection end connected with the core section, at least one portion of the free end of the intermediate lip extending axially beyond the free ends of the interior and exterior lips;
      a periphery of the intermediate lip is interrupted so as to include multiple circumferentially-spaced portions that, when the seal is housed in the groove with a surface of the core section resting against a first wall of the body of the master cylinder, forms supports and passages with a second wall of the body of the master cylinder opposite the first wall;

the surface of the core section includes a peripheral platter, an exterior crown, a heel, and at least one channel;

the exterior crown is axially raised compared to a height of, and occupies a radial region of the surface of the core section that is radially exterior to, the peripheral platter;

the surface of the core section includes at least one connection zone that interrupts an extension of the exterior crown in the radial region;

the heel is positioned radially exterior to the exterior crown and at a circumferential position shared by a respective one of the at least one connection zone;

each of the at least one channel cuts through the peripheral platter and extends radially outward from an interior edge of the seal towards, and terminating before reaching, a respective one of the at least one connection zone;

at least one of the following:
   (a) the connection zone is a cavity in the exterior crown;
   (b) the peripheral platter terminates before the exterior crown; and
   (c) the peripheral platter is separated from the exterior crown by a passage, and wherein at a radial position of the heel, the heel is circumferentially bordered on both sides of the heel by regions of the surface that are axially lower than the heel.

\* \* \* \* \*